Jan. 26, 1932.  F. G. GUEST  1,842,604
VEHICLE JACK
Filed Dec. 11, 1929
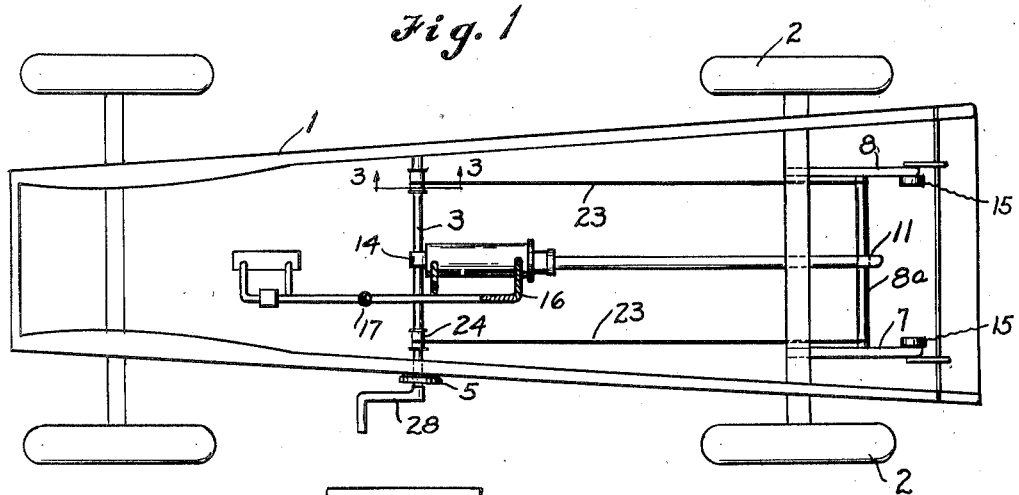
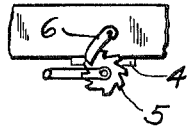
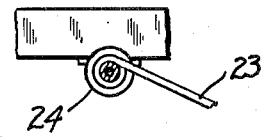
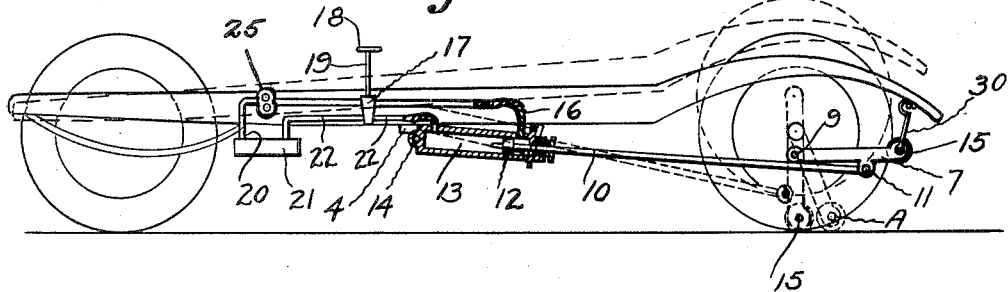
INVENTOR
F. G. GUEST
BY
ATTORNEY Patented Jan. 26, 1932

1,842,604

UNITED STATES PATENT OFFICE

FRANCIS G. GUEST, OF SEATTLE, WASHINGTON

VEHICLE JACK

Application filed December 11, 1929. Serial No. 413,349.

This invention relates to improvements in vehicle jacks and has for its principal object to provide a device of this character which is preferably an integral part of the vehicle, and therefore needing no placing under the vehicle in order to raise the same, such as is customary with an ordinary automobile jack.

A very important additional object is that means are included which, after the vehicle is raised by my improved jack, anti-friction means is brought into play which allows the free sidewise movement of the vehicle if necessary; such, for example, as backing or driving an automobile into a space between other automobiles along a curb where the space is limited.

A further object is to provide means for swinging a pivoted support, the free end of which engages the ground and means for raising it.

The invention is illustrated in the accompanying drawings, in which:

Figure 1 is a plan view of an automobile chassis with my device attached thereto.

Figure 2 is a side elevation, partly in section.

Figure 3 is an enlarged detail view looking in the direction of the arrows 3—3 of Figure 1.

Figure 4 is a view of the crank of the manual operating means.

Referring now more particularly to the drawings, reference numeral 1 represents the chassis, 2 the traction wheels, and 3 a shaft revolubly mounted in brackets 4, which are secured to the chassis, said shaft carrying a ratchet wheel 5 having a coacting pawl 6. 7 and 8 are supports having each of their inner ends pivoted at 9 to the rear axle, and connected together by a cross-bar 8ª so as to form a frame swingable with respect to the chassis.

10 is a rod, one of whose ends is pivoted at 11 upon the cross-bar 8ª. The other end of the shaft 10 terminates in a piston 12 slidable within a piston chamber 13. The left-hand end (Figure 2) of the piston chamber is pivoted to the chassis, as at 14, so that there will be no binding of the parts when the piston with its shaft 10 is reciprocated. The supports 7 and 8 may be provided with casters 15 at their lower terminals.

A pipe 16 connects the rear end of the chamber 13 with an oil reservoir 21 while a pipe 22 forms a connection to the front end. A single acting double valve 17 is positioned in the pipe lines so that the pipes are opened and closed together. A pump 25 is interposed in the circuit to provide a flow of fluid in either direction. Said pump is driven in either direction by any usual means, not here shown.

In operation, the pump is started and the valve opened allowing a flow of fluid through the pipe lines into the rear of the piston 12 which moves said piston forwardly in the chamber 13, pulling supports 7 and 8 into the position shown dotted in Figure 2, thereby transferring the weight of the vehicle from the rear wheels to said supports. The valve 18 is then turned and the piston held in position. To move the supports to inoperative position the motor is reversed and the fluid flows in the opposite direction, forcing the piston rearwardly. The valve 18 is again turned when the supports are raised to hold them in inoperative position. A hook 30 may be provided to guard against leakage of the piston or for use should a manually operative means, such as shown and hereinafter described, be used.

23 are cables, one of each of whose ends is attached to spools 24, rigid with the shaft 3. Their other ends are connected to a cross-bar 8ª. In order to raise the rear traction wheels by means of the cables 23, and in the absence of any of the hydraulic parts just described above, all that is necessary is for the operator to turn a bell crank 28, thus causing the rotation of the shaft 3, and the resultant winding up of the cables 23 upon the spools 24, and a forward swinging of the framework 7, 8, and 8ª from their full line positions to their dotted positions indicated at A, the pawl 6 and sprocket wheel 5 serving to hold the parts in that position with the wheels raised from the ground line so that after any necessary repairs have been made the operator merely lifts the pawl from its position as seen in Figure 4, which will allow the vehicle to descend into working position upon the ground line automatically, whereupon the framework may be hooked by means of the hook 30, to the chassis.

What is claimed to be new is:

An apparatus of the class described comprising a pair of supports pivotally mounted on the frame of an automobile adjacent the rear axle, ears integral with said supports, a bar connected to said ears, a rod connected at one end to the mid point of said bar, a piston on the other end of said rod, a cylinder pivotally carried by the frame reciprocally receiving said piston, a pump for operating said piston, flexible connections allowing pivotal movement of the cylinder during reciprocation of the piston whereby said rod is used to raise and lower the pair of supports, and hooks carried by the supports to engage the frame and lock said supports in inoperative position.

In testimony whereof I affix my signature.

FRANCIS G. GUEST.